March 16, 1954  J. A. KANE  2,672,351
HANDLE FOR PUSHING TRICYCLES
Filed Feb. 8, 1952
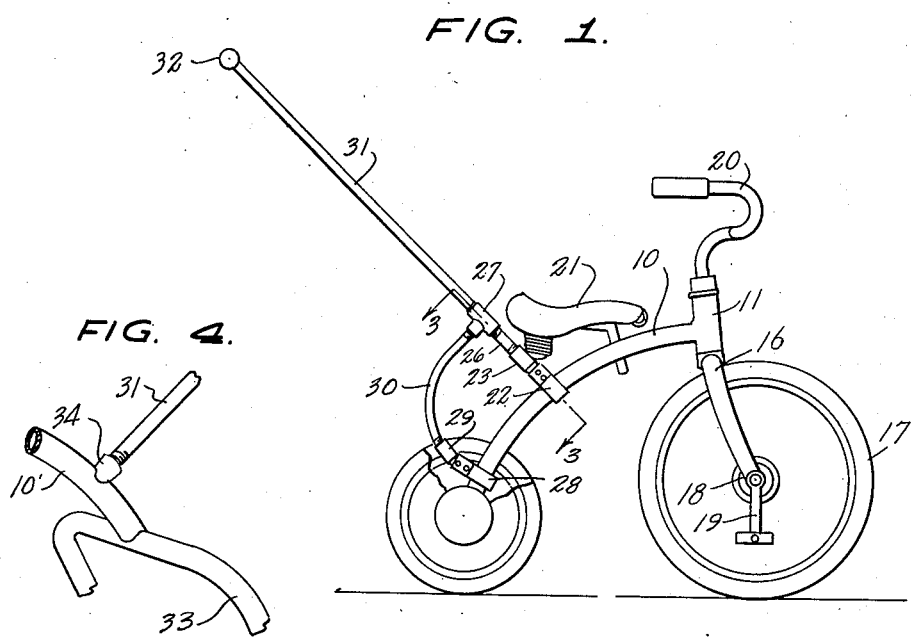
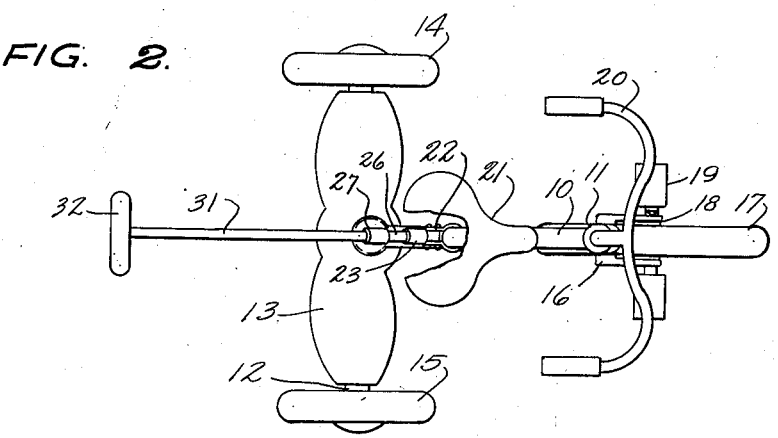
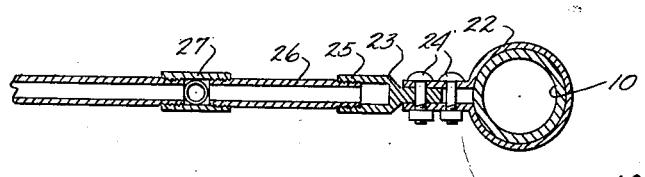
INVENTOR
JAMES A. KANE,
BY
McMorrow, Berman + Davidson
ATTORNEYS Patented Mar. 16, 1954

2,672,351

UNITED STATES PATENT OFFICE 2,672,351

HANDLE FOR PUSHING TRICYCLES

James A. Kane, Yonkers, N. Y.

Application February 8, 1952, Serial No. 270,625

2 Claims. (Cl. 280—289)

This invention relates to handles for small, occupant propelled vehicles, and more particularly to a detachable handle for a vehicle, such as a tricycle.

It is among the objects of the invention to provide an improved handle assembly for a vehicle, such as a tricycle, which includes a socket structure permanently mounted on the vehicle and a handle shaft detachably connected to the socket structure; which can be applied to a vehicle with no modification of the vehicle construction and does not interfere in any way with the operation of the vehicle; which gives an attendant full control of a vehicle, such as a tricycle occupied by a small child; and which is simple and durable in construction, economical to manufacture, easy to install, and neat and attractive in appearance.

Other objects and advantages will become apparent from a consideration of the following description and the appended claims in conjunction with the accompanying drawing wherein—

Figure 1 is a side elevational view of a tricycle with a handle assembly illustrative of the invention operatively mounted thereon;

Figure 2 is a top plan view of the tricycle and handle assembly illustrated in Figure 1;

Figure 3 is a fragmentary cross sectional view on an enlarged scale on the line 3—3 of Figure 1; and Figure 4 is a fragmentary perspective view of a somewhat modified form of the invention.

With continued reference to the drawing, the tricycle is of known construction and comprises a frame including a curved bar 10 which extends longitudinally of the tricycle and has its front end disposed above its rear end and a fork bearing sleeve 11 at the front end thereof. At its rear end the frame bar 10 is connected to a rear axle 12 substantially at the mid-length location of the axle and a tread plate 13 is disposed on the axle at the upper side thereof. Rear wheels 14 and 15 are journaled on the axle 12, one at each end thereof, and a front wheel fork 16 is journaled in the fork bearing 11. A front wheel 17 is journaled in the front fork 16 on an axle 18 carrying foot pedals 19, and a handlebar 20 is secured to the upper end of the fork 16 and extends above the fork bearing 11. A seat 21 is mounted on the frame bar 10 adjacent the fork bearing 11.

The handle assembly comprises a first split clamp 22 surrounding the tubular frame bar 10 adjacent to and rearwardly of the seat 21, a coupling 23 having at one end an apertured tongue disposed between the ends of the clamp 22 and secured to the clamp by the bolts or screws 24 extending through registering apertures in the ends of the clamp and the coupling tongue and having at its other end an internally screw threaded socket portion 25, a strut 26 in the form of a pipe nipple screw threaded at one end into the socket portion 25 of the coupling 23 and a T fitting 27 threaded onto the other end of the strut 26, the strut 26 extending upwardly and rearwardly from the frame bar 10, as is particularly illustrated in Figure 1. The assembly further includes a second split clamp 28 surrounding the frame bar 10 at a location spaced rearwardly from the clamp 22, a coupling 29 secured at one end to the clamp 28 in the manner indicated above, and a strut 30 in the form of a longitudinally curved pipe nipple threaded at one end into the coupling 29 and at its other end into the side opening of the T fitting 27. This provides a socket assembly which is permanently attached to the vehicle, the T fitting 27 constituting a socket for the detachable handle.

The assembly further includes a handle shank 31, preferably in the form of a straight tube having external screw threads at one end threaded into the end of the T fitting 27 remote from the strut 26 and having a crossbar 32 on its other end constituting a handle.

With this arrangement, the handle shank 31 can be attached to or removed from the vehicle by merely threading it into or out of the socket 27, and when attached provides a rigidly attached handle by means of which an attendant can completely control the movements of the tricycle.

In the modified arrangement illustrated in Figure 4, the curved frame bar 10' terminates short of the rear axle of the tricycle and is connected at its rear end to the rear axle of the tricycle by a U-shaped bail 33 which is also preferably of tubular construction. In this arrangement, a single internally screw threaded socket 34 is firmly attached by suitably means, such as welding, to the frame bar 10' adjacent the bail 33 and receives the screw threaded end of the handle shaft 31.

The invention may be embodied in other specific forms without departing from the spirit or essential characteristics thereof. The present embodiments are therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tricycle having a curved frame bar and a seat mounted on said frame bar, a handle assembly comprising a first clamp secured on said frame bar rearwardly of and adjacent said seat, a first strut projecting upwardly and rearwardly from said first clamp, a screw threaded socket secured to the end of said first strut remote from said first clamp, a second clamp mounted on said frame bar at a location spaced rearwardly from said first clamp, a second strut connected at one end to said second clamp and at its other end to said socket, a handle shaft threaded at one end into said socket and extending upwardly and rearwardly therefrom, and a crossbar on the other end of said handle shaft.

2. In combination with a tricycle having a frame bar and a seat mounted on said frame bar, a handle assembly comprising a screw threaded socket disposed adjacent to and rearwardly of said seat, means securing said socket to said frame bar, a handle shaft threaded at one end into said socket, and a handle on the other end of said handle shaft, said socket comprising a T fitting and said means mounting said socket on said frame bar comprising split clamps surrounding said frame bar at spaced apart locations therealong and struts secured each at one end to a corresponding clamp and at their other ends to said socket, one of said struts being threaded into one end of said T fitting and the other strut being threaded into the side opening of the latter.

JAMES A. KANE.

References Cited in the file of this patent

UNITED STATES PATENTS

| Number | Name | Date |
|---|---|---|
| 911,791 | Whitney | Feb. 9, 1909 |
| 1,288,809 | Benson | Dec. 24, 1918 |
| 2,516,705 | Kraeft | July 25, 1950 |

FOREIGN PATENTS

| Number | Country | Date |
|---|---|---|
| 7,538 | Great Britain | of 1895 |
| 241,569 | Switzerland | Aug. 1, 1946 |
| 628,992 | Great Britain | Sept. 8, 1949 |
| 642,871 | Great Britain | Sept. 23, 1950 |